United States Patent [19]

Aneshansley et al.

[11] 4,139,294

[45] Feb. 13, 1979

[54] CAMERA WITH PIN REGISTRATION FOR FILM AND END-OF-FILM INDICATION MEANS

[75] Inventors: James T. Aneshansley, Brooklyn; Gerard J. Diebold, Spring Valley, both of N.Y.; Alfred I. Thumim, Teaneck, N.J.

[73] Assignee: Richmark Camera Service, Inc., Carlstadt, N.J.

[21] Appl. No.: 777,463

[22] Filed: Mar. 14, 1977

[51] Int. Cl.² .................. G03B 17/36; G03B 1/00
[52] U.S. Cl. ................................. 354/217; 354/213
[58] Field of Search ............... 354/202, 203, 206, 207, 354/213, 215, 217, 288, 289; 355/40

[56] References Cited

U.S. PATENT DOCUMENTS

| | | | |
|---|---|---|---|
| 1,213,687 | 1/1917 | Pelham | 354/213 |
| 2,147,106 | 2/1939 | Nuchterlein | 354/203 |
| 2,591,417 | 4/1952 | Frye | 354/217 X |
| 3,852,787 | 12/1974 | Nims et al. | 354/202 X |
| 4,034,393 | 7/1977 | Goldmacher | 354/217 X |
| 4,050,810 | 9/1977 | Broderick et al. | 355/40 |
| 4,062,028 | 12/1977 | Tezuka et al. | 354/152 |

Primary Examiner—Donald A. Griffin
Attorney, Agent, or Firm—S. C. Yuter

[57] ABSTRACT

A standard 35mm single lens reflex camera is modified to include a pair of film frame registration pins located in the hinged rear cover plate, these pins being movable toward film covering the film aperture, with the ends of the pins being tapered to readily enter a pair of sprocket holes on opposite sides of each frame of film, for precisely registering the position of each frame with the film aperture. The registration pins engage the film before and during each exposure, and are retracted before each advancement or rewinding of the film. Also located on the camera's rear cover plate is a spring-biased indicator pin extending toward the film, and aimed directly at an electrical ground contact on the film guide. This indicator pin is blocked from contacting the ground by the top edge of any film present, but when the top edge of the film is not present, as during the last phase of re-winding or when there is no film in the camera, the indicator pin will automatically reach the electrical contact, thereby closing a circuit and turning on an indicator light.

10 Claims, 13 Drawing Figures

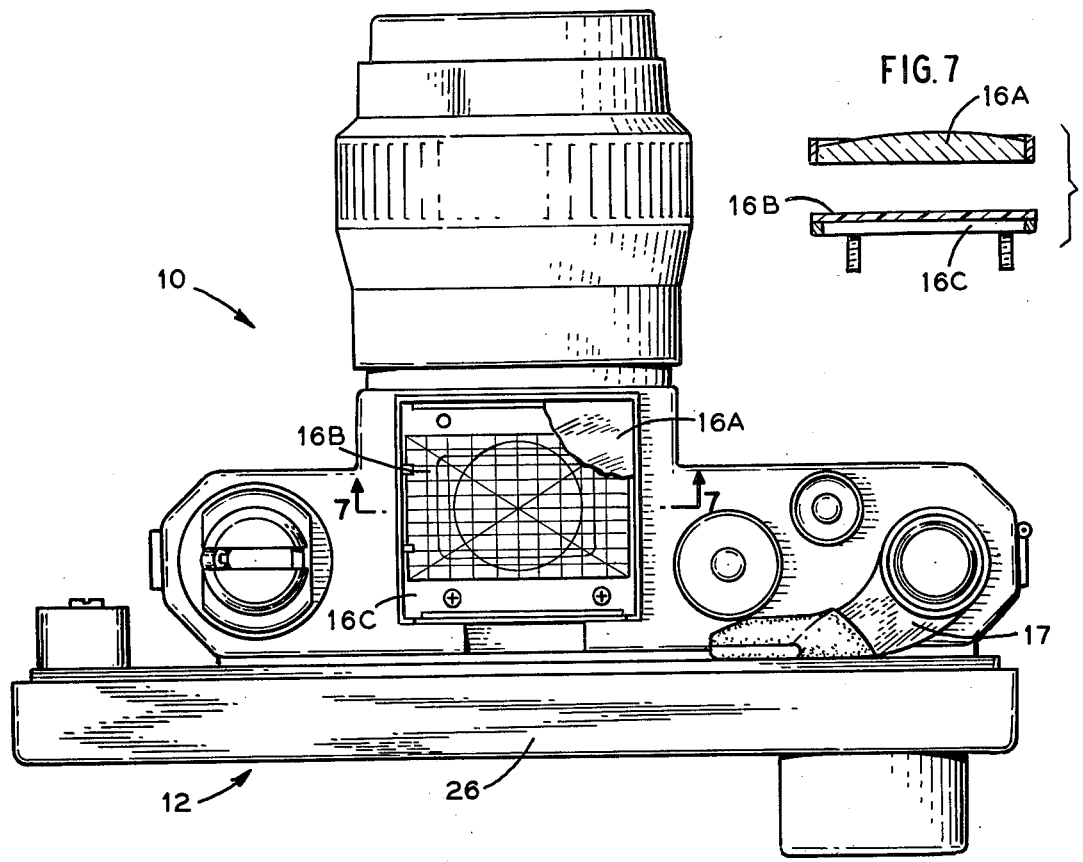
FIG. 1
FIG. 7
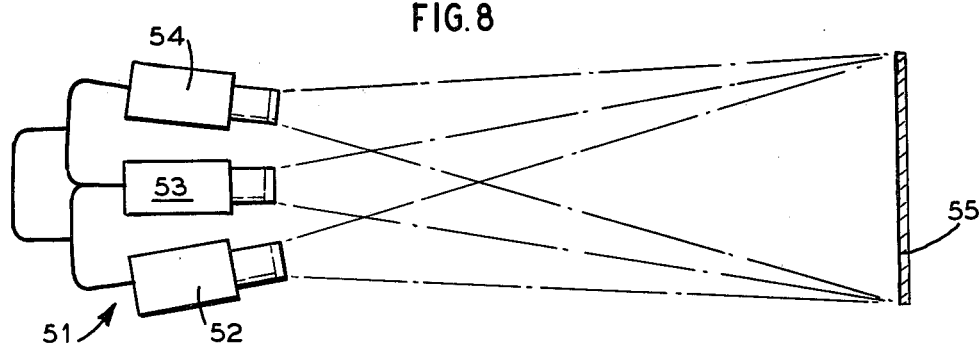
FIG. 8
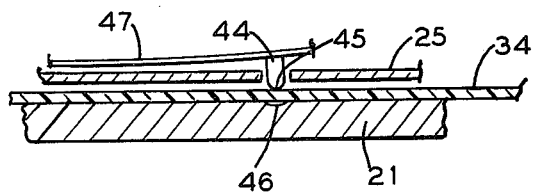
FIG. 6

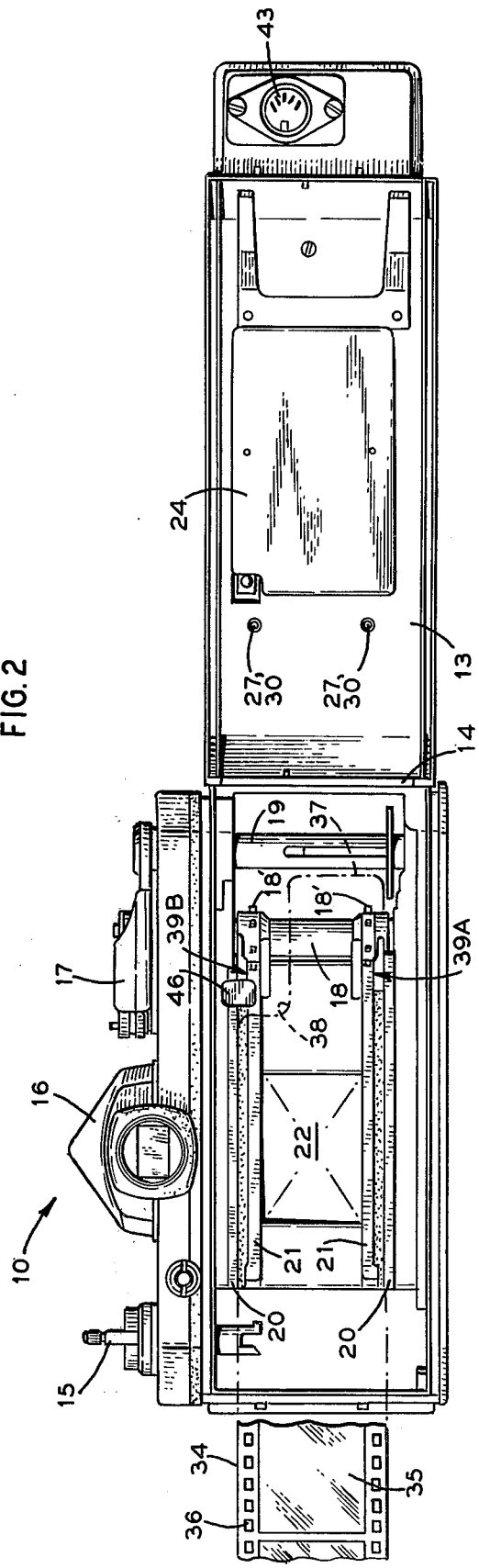

FIG. 9
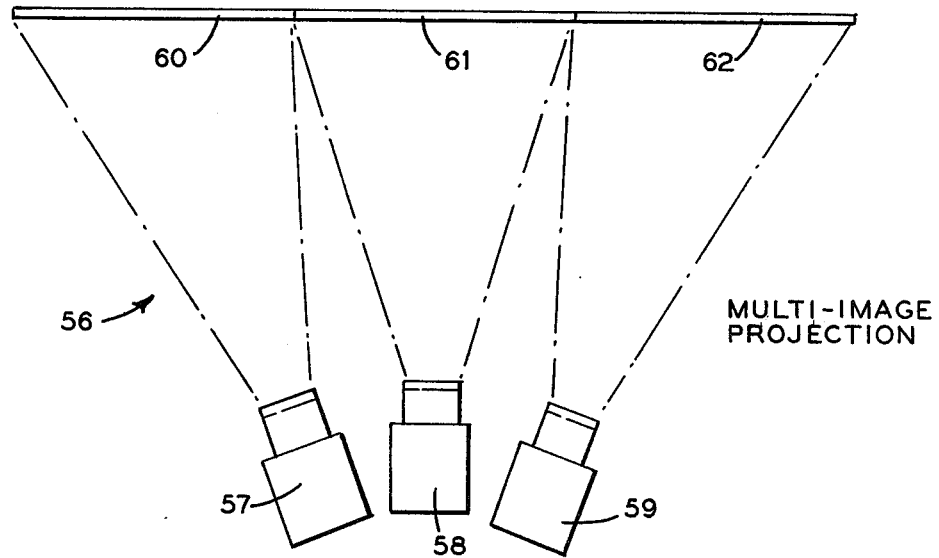
MULTI-IMAGE PROJECTION
FIG. 10A
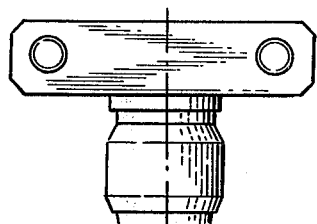
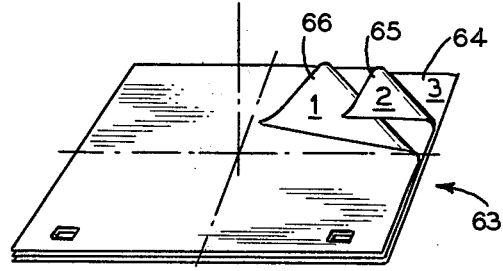
FIG. 10B
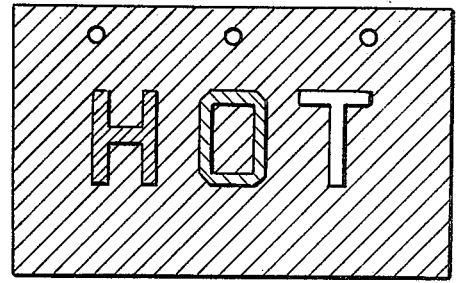

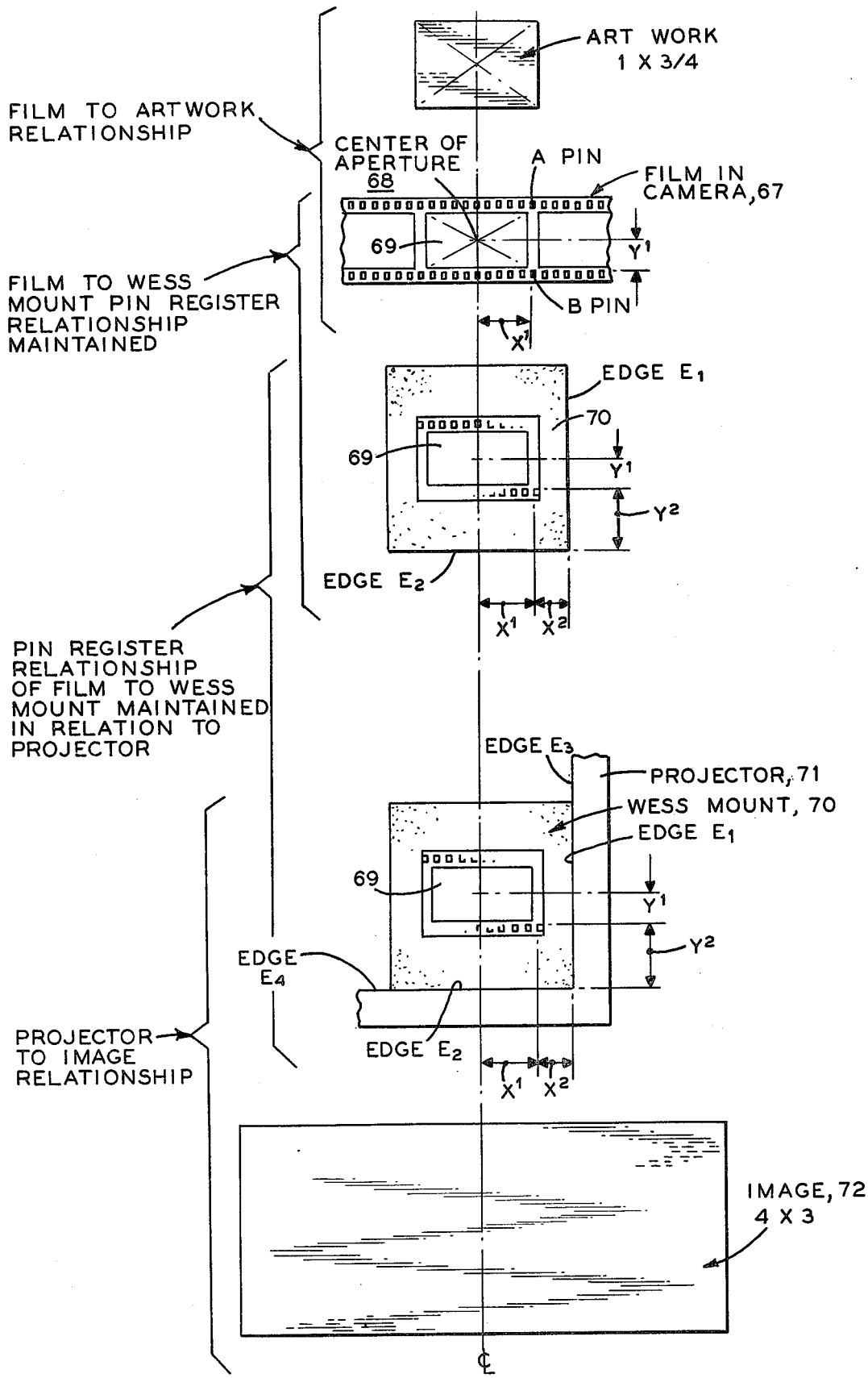

CAMERA WITH PIN REGISTRATION FOR FILM AND END-OF-FILM INDICATION MEANS

BACKGROUND OF THE INVENTION

This invention is in the field of 35mm slide photography, and particularly the procedures and apparatus for exposing 35mm film to be used in making slides for multi-image projection.

Slide photography has developed from the early and still used simple slides made with carboard mounts for a single frame of 35mm film, to the pin-registered Wess mounts which are plastic envelopes for holding a single frame of 35mm film in precise location and orientation relative to the sprocket holes in the film and the edges of the envelope. The slides made with cardboard mounts are typically loaded in a slide projector to project one image at a time on a screen or a wall. During the steps of exposing the film for these slides, securing the film in the cardboard mounts, positioning the slides in a projector, and projecting the images, there was no concern about the positional relationship of each frame of film to the camera's film aperture, to the slide mount, the projector, or the screen, because for each frame and slide there is produced only a single image, with no need to accurately locate or align that image relative to any other image.

More recently slide photography has become more popular as a sales and promotional medium for business, industry and education, in addition to its use in entertainment, and new sophisticated photographic techniques evolved. These techniques include using two or more projectors to produce a composite image comprising adjacent images from the separate projectors, producing a series of different single images in the same location by different projectors operating at different times, the apparatus for this latter technique called a dissolving system when one image dissolves as the next appears, and providing other programmable multi-imaging slide shows. This led to the popular formats of two or three adjacent screens and one bank of multiple projectors for each screen.

With these techniques there is one basic problem; when one projected image is placed adjacent another, and these images are segments of a single art work, there may not be sufficient registration of mating lines on the screen for the result to be usable, saleable, and/or aesthetically satisfying. Any lack of registration in the slides becomes vastly magnified in the projected images, and in the normal cardboard mounted slides, the film is merely approximately positioned and adhered in place with no particular registration relationship established between film, the camera, the projector, and other images on the screen.

A development which significantly reduced the registration problem was the Wessinger or Wess mount for slides. This is a plastic envelope having its own registration projections or pins for entering sprocket holes of a film frame to align it exactly as it was aligned in the camera relative to the center of the film aperture. When a Wess mount is placed in a projector its side edges establish reference surfaces whereby the registration of the film in the camera is effectively transferred or converted to a corresponding registration in the projector. This Wess mount system became the standard in the industry and made possible the great development of multi-image slide work now used by corporate, educational, and advertising media centers.

While the Wess mounts provided the necessary precision for transferring pin registration from the film to the mount and thence to the projector and to the screen, the overall photographic technique required the original film to be in equally precise registration in the camera. To provide such film registration in the camera there have been developed production slide film cameras such as animation film strip cameras, or alternatively custom-made cameras having accurate film registration means. Unfortunately these cameras cost between $15,000 and $45,000 each, which is far too expensive for the many small and medium-sized media centers who do or could produce the multi-image slide work now growing in popularity. Without their own in-house production or custom pin-registered cameras, these media people have the problems of transporting their art work and personnel to often inconveniently located production centers, paying expensive fees, and perhaps the worst problem, experiencing uncontrollable and intolerable delays in their production schedules.

Attempts have been made to use the far cheaper, smaller, and widely available single lens reflex 35mm cameras (SLRs); however their registration means is limited to the drive sprocket pins which are simply too imprecise for multi-imaging work. As is well known, these sprocket teeth enter sprocket holes in the film and as the sprocket rotates the film is advanced. A more careful examination reveals that the sprocket tooth dimensions are necessarily much smaller than the sprocket hole dimensions in the film because the teeth approach the holes at an oblique angle and much clearance is needed in these ultra-compactly designed SLR cameras; still further clearance is provided to compensate for variable shrinkage that occurs in the film and alters the distances between sprocket holes. Consequently sprocket teeth dimensions cannot even closely approximate sprocket hole dimensions, and since this is essentially the only registration means in SLRs, these cameras simply do not have the capability for registration of the Wess mounts in the magnitude required for multi-image slide work.

The present invention represents a solution to the problem of the media people, at a time when the problem is becoming more severe due to greatly increased demand for precision slide work, escalating costs of production and custom cameras, and a trend for even more sophisticated and expensive cameras designed especially and solely to produce precisely pin-registered slides.

These expensive and limited-use custom cameras typically have very large diameter sprocket drives for registering and advancing the film, or there are pin registration techniques, such as a moving cam-driven part having fixed pins which enter film sprocket holes and lift the film off the film aperture and in a rotating fashion advance and place the film, frame-by-frame. These cameras, in addition to being large and non-portable, are expensive and restricted to this particular use, which would unreasonably tie up capital for the limited budget small media offices. Finally, it has been determined that the structural features of these production and custom cameras are not adjustable to miniaturization and cannot be transferred into the small SLR cameras whose compact design has absolutely no additional space for a larger drive sprocket, or moving cam elements as described in the custom cameras.

A solution to these problems has been found as will be summarized below, followed by a detailed description of the preferred embodiment of our new invention.

SUMMARY OF THE INVENTION

The invention comprises a 35mm single lens reflex camera having structural elements to accurately position and register each frame of a strip of 35mm film while it is positioned adjacent the camera aperture for exposure. Standard 35mm film includes precisely dimensioned sprocket holes along both top and bottom edges, these holes being engaged by teeth of a sprocket wheel which with the take-up spool advances the film in the forward direction. A pair of film frame registration pins are located on the hinged rear cover plate of the camera, these pins being movable toward the film frame which is adjacent the camera aperture. The ends of the pins are tapered to readily enter a pair of sprocket holes on opposite sides of each frame of film before and during exposure of the film, after which the pins are retracted and the film advanced. The pins engage the holes in a manner such as to manipulate and slightly move the film until its sprocket holes conform exactly to the pins, as regards location and orientation. When the pins extend fully through the sprocket holes, the film will be automatically positioned, oriented and aligned essentially exactly the same for each exposure. More particularly the film frame will be positioned such that its side and end edges and center conform exactly to those of the camera aperture.

Standard 35mm film has rectangular sprocket holes with dimensions of 0.078 inches in the direction of film advance and 0.110 inches in the transverse direction. Although the ends of the registration pins are tapered and thinner than the above hole dimensions, the bases of the pins have larger and precise dimensions, whereby one of the pins is generally rectangular in section and substantially fills one of the sprocket holes, and the other pin is generally rectangular and substantially fills its respective sprocket hole only in the direction of film advance, with a small clearance provided on each side of the pin in the transverse direction. Other configurations of registration pins are possible, such as oval, which could engage all four edges of the hole, or any other shapes, so long as each frame of film is positioned identically to the others.

To drive the registration pins toward and into engagement with the film a solenoid is mounted to the rear cover plate of the camera, with circuit means to activate the solenoid before and during each exposure. A spring is also provided to retract the pins before advancement and rewinding of the film, and a rigid base or mounting plate for the pins, spring and solenoid is preferably provided to assure sufficient stiffness and reliable accuracy of the system. The pins are located such that their ends, which enter the film sprocket holes, will extend into an empty space between the lead ends of the film guides and the teeth of the drive sprocket. The rear cover plate which carries the registration pins must be aligned with equal and reliable accuracy each time it is closed, and to assure such alignment, a guide pin is attached to the free end of the cover plate opposite the hinged end, and a closely fitting guide slot is provided in the camera housing.

Another feature of this invention that is operable alone or in combination with the registration pins is an end-of-film indicator. This feature takes advantage of the fact that the leader portion of each strip of 35mm film has its upper section cut away for a few inches to thereby define the narrower leader which is easier to feed into the take-up spool slot.

A spring biased indicator pin is located on the rear cover plate of the camera and extends toward the film, being aimed directly at an electrical ground contact on the film guide near the lead end of the upper guide, which is also close to the upper sprocket teeth. Whenever film in the camera is at least partially advanced so that its upper edge covers the ground contact, the indicator pin will engage the film edge and thus be precluded from fully extending to the ground contact. During the last phase of rewinding the film while the leader portion is still engaged in the take-up spool, the cut-way portion of the film by which the leader is defined will leave exposed the ground contact, and the indicator pin will automatically reach the ground and close an electrical circuit, thereby turning on an indicator light.

One of the specific benefits of the earlier described pin registration feature is the capability for taking multiple exposures with the same frame of film, whether the frame is held stationary during the exposures or advanced, then rewound and advanced again for the second exposure. Of significance is that with the capability of rewinding and then advancing, there is the danger of fully rewinding such that the leader is pulled out of the take-up spool. To open the camera and re-thread the leader is a nuisance, and such rewinding might initiate the frame-counting indicator at a different start point, which could seriously confuse the camera operator in determining which frames are undergoing multiple exposures. Consequently the end-of-film indicator will automatically signal that rewinding should cease immediately because it has proceeded so far that the leader is almost disengaged. As suggested earlier, this end-of-film indicator is useful both in combination with the pin registration feature and alone; also this feature can be incorporated into almost any camera which uses film having a leader portion that is narrower than the remainder of the film.

By this invention there has been found a way to use the mass produced and therefore readily available and relatively inexpensive SLR 35mm cameras to do the job of providing pin-registered exposed film for mounting in pin-registered Wess or other comparable slide mounts. For the first time, anyone having a 35mm SLR camera modified according to the present invention, can produce slides suitable for multi-image slide shows including animation slides where six projectors are programmed to provide dissolving images in the same space on a screen which change every one-twelfth of a second, and multiple exposure slides where a single frame (a) is either held reliably still during sequential multiple exposures, or (b) is re-exposed after the frame is advanced, rewound and re-advanced.

The cost of the structural modification to a SLR camera, according to this invention, is a fraction of the cost to make production or custom cameras; the modified SLRs remain small, light, portable, and equipped with all the sophisticated features and refinements of the original apparatus. In fact these cameras can be used in their ordinary manner by merely replacing the modified rear cover plate with the standard cover plate, because the modifications cause no interference with normal functions. A preferred embodiment of the invention has been shown in the drawings accompanying this specification, with a Nikon F2$_{TM}$ SLR camera, selected mainly because this camera is perhaps already one of the most widely used and popularly accepted standard cameras in the industry for 35mm photography, and now substantially all brands of SLRs can be modified to provide the pin-registered slides required for this growing communication medium.

BRIEF DESCRIPTION OF THE DRAWINGS

FIG. 1 is a sketch showing a top plan view of the new invention as incorporated in a 35mm single lens reflex camera.

FIG. 2 is a sketch showing a rear elevation view of the invention with the back cover plate in open position.

FIG. 6 is a detail of the registration pins shown in FIG. 5.

FIG. 7 is a detail of the reticle mount shown in FIG. 1.

FIG. 8 is a schematic drawing showing a dissolving system of projectors, for use in slide animation.

FIG. 9 is a schematic drawing showing a multi-image projection system.

FIG. 10A is a schematic drawing showing a multiple exposure technique.

FIG. 10B shows a multiple exposure obtained by the technique of FIG. 10A.

FIG. 11 is a schematic drawing showing the transfer of pin registration from camera to projector, and FIG. 12 is a schematic drawing showing a single frame of film in pin registration.

DETAILED DESCRIPTION OF THE PREFERRED EMBODIMENT

Figure 5:
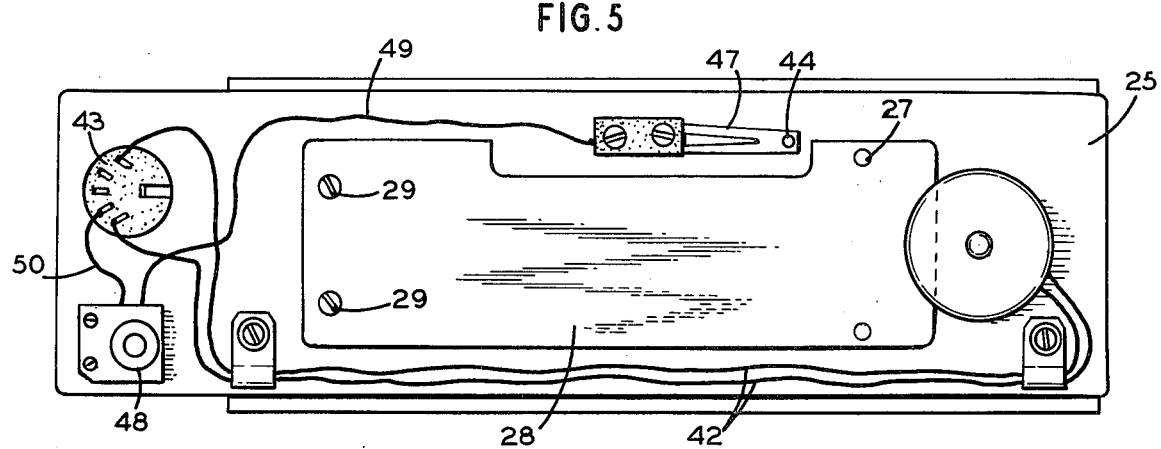
FIG. 5 is a drawing showing a rear elevation view of the mounting plate for the registration pins.

FIG. 1 illustrates a standard 35mm single lens reflex camera 10 with the motor driven module attached to the bottom portion of the camera and extending upward.

FIGS. 1 and 2 show in top plan view and rear elevation view respectively, the new pin registration device 12 attached to the rear of the camera, and specifically to the rear cover plate 13 of the camera which is pivotable on hinge at the right side when looking at the rear of the camera.

FIG. 2 shows the inside of the rear of the camera. The known components on the camera include the film winding knob 15, the view finder 16, the film advance lever 17, the sprocket drive spool 18, the film take-up spool or reel 19, the film guides 20, and the lands 21 adjacent and parallel to the film guides. Between the film guides and lands is the film aperture 22 and the movable shutter. Back cover 13 has mounted thereon a spring biased pressure plate 24.

Figure 3:
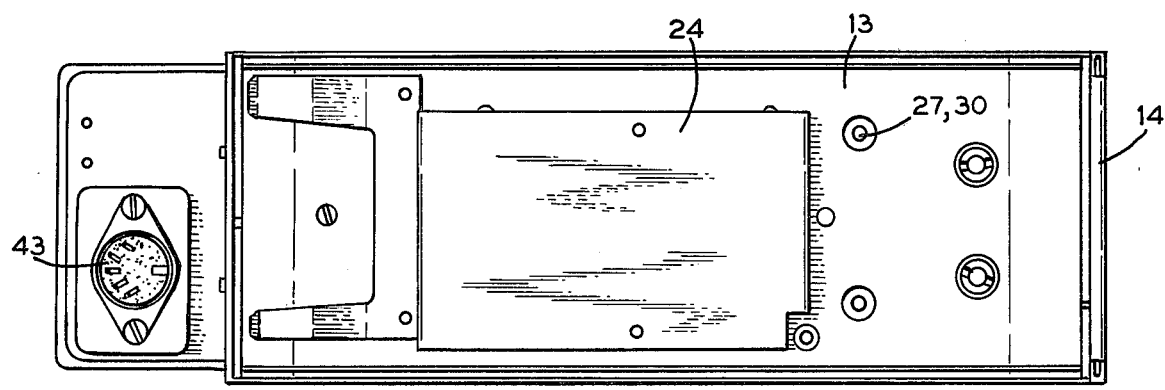
FIG. 3 is a drawing showing an elevation view showing the inside of the rear cover of the camera.

This invention concerns the modification of the basic camera and the addition of registration pins and associated drive means to an otherwise standard 35mm single lens reflex camera as a Nikon F2. The basic structure and operations of the camera and other cameras of this type are well known in the prior art as illustrated and described in numerous texts, articles and advertisements. FIG. 3 shows more clearly the inside surface of the back cover 13 of the camera with pressure plate 24 readily visible, and hinge 14 providing the pivot connection of the back cover with the remainder of the camera.

Figure 4:
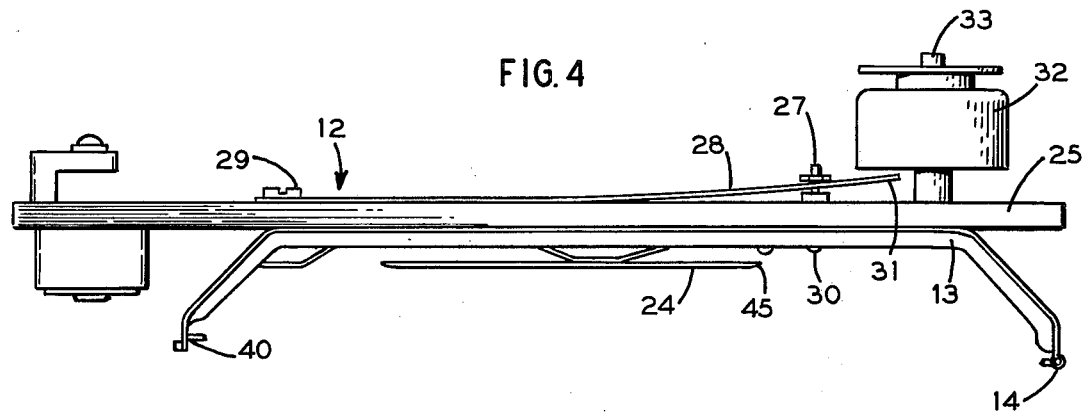
FIG. 4 is a drawing showing a top plan view of the rear cover of the camera and the mounting plate for the registration pins.

As shown in FIGS. 4-5, the pin registration mechanism 12 is carried by and assembled on a stiff base plate 25 with an outer cover 26 (FIG. 1). Registration pins 27 are secured to a flat spring 28 which is mounted to the base plate 25 via fastening means 29. The spring has a natural position as shown in FIG. 4 which serves to hold pins 27 in a withdrawn condition wherein the tips 30 of pins 27 are withdrawn substantially into the back cover 13 and thus clearly away from the film. Spring 28 has a tip part 31 which engages the lower portion of solenoid 32 also mounted to the base plate 25. When activated the solenoid armature part 33 is electromechanically driven downward, and accordingly drives tip 31 of the spring downward carrying with it, registration pins 27. Upon de-activation of solenoid 32, the spring tip 31 drives the solenoid back up, and carries the pins upward into a withdrawn or retracted position.

FIG. 2 further illustrates a strip of film 34 with a typical frame 35 lined by the standard eight sprocket holes 36 on each side. A fresh roll of film would have a leader section 37 shown about to enter the film take-up spool 19. To form the leader section 37, the film has a cut away portion 38 which will be discussed later as regards the end of film indicator mechanism. The sprocket drive 18 has sprocket teeth 18' for engaging the sprocket holes 36 in the film; there are eight sprocket teeth around the periphery at each end of the sprocket, corresponding to the eight sprocket holes adjacent each frame in the film strip, so that a single rotation of the drive sprocket will advance the film one frame. There are two arrows directed to spaces designated 39a and 39b adjacent the sprocket teeth in the sprocket drive 18. These are spaces into which the registration pins extend after they have transversed two sprocket holes in film at that area.

Now follows a description of the operation of this feature of the invention. When the solenoid is actuated, its armature 33 is driven downward carrying the spring 28 and registration pins 27 also downward; the tips 30 of the registration pins enter two opposing sprocket holes 36 in film which at that moment is extending across the space 39a and 39b defined between the end of film guides 20 and the sprocket drive 18 and as further shown schematically in FIG. 12. The tips of the registration pins are tapered, and the film is slightly movable in all directions, such that the tapered pins enter the over sized sprocket holes until the base of the pins, which have a larger diameter than the tips, fully penetrate the holes. The rectangular upper pin fully occupies the upper sprocket hole, and the lower pin occupies the lower sprocket hole fully only in the direction of film advance. This filling of the holes causes the film to move and conform to the registration pins, and this is how the film becomes precisely aligned. The pins remain in registration during the exposure period of the particular frame so registered, and then the pins are retracted immediately before the drive sprocket and take-up reel advance the film to the next frame. Similarly, for a double exposure situation, the pins are removed from the sprocket holes while the shutter mechanism is re-cocked for a second exposure. They are returned to position before the next exposure is made. The exact shape, dimensions and orientation of the registration pins relative to the sprocket holes will be discussed in further detail in later paragraphs.

There is considerable difficulty in relating the registration pins to the center of the aperture, so that each frame so registered by the sprocket pins will in fact align itself with the center of the aperture. One technique for accomplishing this is by trial and error of actually exposing film and moving the pins until the correct location is found; other optical, mechanical or electrical techniques are possible. The base plate member 25 of the registration device 12 has a pair of holes drilled through, as clearance for the registration pins, and the back plate 13 of the camera has corresponding clearance holes.

Since the holes are now properly located relative to the back plate, the back plate must be properly located relative to the remainder of the camera. One end of the back plate is hingedly attached in a manner which is relatively sturdy and secure, and the other end of the back plate has a locator pin 40 as shown in FIG. 4 which engages in locating notch 41 as shown in FIG. 2. In this manner the precise relationship of the registration pins on the base plate and back plate is transferred accurately to the film frame which is adjacent the film aperture. Also mounted on base plate 25 are electric wires 42 interconnecting solenoid 32 and a connector socket 43 which is also visible in FIGS. 1, 3, 5, and 4. The spring member 28 mounted to plate 25 is preferably made of phospher bronze or a material having suitable characteristics for the requirements described.

A second feature of the invention designated end-of-film indicator is significant in combination with the pin registration means or alone. Because of the new pin registration, the camera has the capability to take second and third exposures on the same frame all of which exposures will be precisely located in the same registration relative to the center of the film aperture and relative to the sprocket holes in the film frame for that particular frame. In some situations exposed film is rewound, in preparation for re-advance and second exposures of selected frames. In these instances it is rather important that the film not be rewound too far, or the leader portion will come out of the take-up reel and the camera will have to be re-opened in order to restart the film. To avoid excessive re-winding the second feature of the new invention indicates when the strip of film has been rewound to the point where the leader has begun to emerge from the take-up reel, but the end of the leader is still securely engaged in said take-up reel, and the adjacent portion of the leader is still engaged by the drive sprocket.

The invention comprises a spring biased pin 44 which extends from the mounting plate 25 inward through the camera back cover 13 and has a tip part 45 which is aligned to contact an electrical ground contact, formed as depression 46 shown in FIG. 2. The indicator pin 44 is at all times biased by the spring 47 to extend inward toward said ground contact 46. As shown in FIG. 5 the indicator pin 44 which ultimately contacts the ground, is connected via wire 49 to connector socket 43. FIG. 2 shows the leader portion of the film 37 has the cut away part 38 which leaves clear the ground contact 46. If the back of the camera were closed, then the indicator pin 44 would extend inward and its tip 45 would extend into and contact area 46, because the film was in a condition of initial advancement, or almost completed rewinding. Electrical circuit means would, under these circumstances, be completed causing the indicator light to turn on, this light 48 being visible through the back cover of the pin registration casing.

Consequently the light would be on or capable of going on when there is no film in the camera, when the film leader has been inserted into the take-up reel but the film has not yet been advanced beyond the point where the cut-out shoulder 38 has passed the contact point 46, or where the film is being rewound and the shoulder 38 has just passed the contact point 46. Obviously the rewind mode preceeding second exposure requires that the operator should cease rewinding immediately when the indicator light goes on; the lens is capped preventing exposure and the film is then advanced to the desired frame, each advancement actuates the solenoid, depresses the registration pins, and alligns the film.

Some of the multi-imaging techinques previously discussed are shown schematically in FIGS. 8-10, to merely illustrate more clearly the environments wherein the new invention is so beneficial. FIG. 8 shows a dissolve system 51 utilizing three projectors 52-54 aimed at the same screen 55; it is possible to stack three additional projectors, or even a greater number, and sequence the projection time so that as one projector fades out, another projector begins to fade in, and the image from the first projector is dissolved into the image of the second. Normal cycle time to change slides in a projector is about one-half of a second; when six projectors with overlapping cycles are programmed together, it is then possible to change images every one-twelfth of a second, which is approximately the speed necessary for full slide animation.

A second technique for utilizing the pin-registered cameras of this invention is designated multi-image projection 56 as shown in FIG. 9 wherein three projectors 57-59 are positioned in an aray, whereby the images 60-62 are adjacent and perfectly matching without any overlap. This may be used where each image is one segment of a whole image, or where each image is dissimilar from the others, but must be registered in order to cooperate therewith.

The third situation in which the pin registration of a new camera is necessary is in multiple exposure systems wherein a single frame is held in position while the art work is partially changed a number of times, and multiple exposures are made on that single frame. In FIG. 10a as shown, the art work 63 consists of a base piece, followed by first, second and third transparent overlays 64-66 each being somewhat different, but having the identical outline of the art work, namely the letters "HOT". By using the different transparencies, letters can be colored differently, while the outlines of the letters remain exactly the same per FIG. 10b.

FIG. 11 illustrates schematically how the pin register relationship is maintained from the new camera to the projector. When the film 67 is in the camera and frame 69 is centered with the aperture registration pins A and B engage corresponding sprocket holes, establishing the precise dimensional relationships from pin B, for example, of distance $x'$ in the film advance direction and $y'$ in the transverse direction to the center of the aperture. Later when the same film frame 69 is secured in a Wess mount 70, the $x'$, $y'$ relationship still exists, and a corresponding $x^2$, $y^2$ relationship is established from the earlier reference points or lines to the edges $E_1$ and $E_2$ of the slide mount envelope 70. Finally, when the slide 70 is positioned in a suitable projector 71, the slide edges $E_1$ and $E_2$ engage projector reference edges $E_3$ and $E_4$ respectively, whereby the earlier relationship of $x'y'$ and $x^2y^2$ are still maintained to produce the corresponding image 72.

FIG. 12 shows schematically a fragment of a single frame 73 of film with registration pins 74, 75 of the new camera fully engaged in a pair of sprocket holes. Each sprocket hole has standard dimensions of 0.078 × 0.110 inches. The upper registration pin 74 has essentially the same dimensions at its base as the sprocket hole dimensions, and thus completely fills the sprocket hole 74', establishing contact along all edges defining the hole. The lower pin 75 has dimensions 0.078 × 0.100, and thus fills its sprocket hole 75' only in the film advance direction indicated by arrow 76, leaving clearance space in the transverse direction indicated by arrow 77 to allow for film shrinkage, which occurs and is somewhat variable depending on temperature and other factors. As described earlier, the tip or lead ends of these registration pins are tapered to readily enter the sprocket holes even when not aligned with the pins. The cross-section of the bases of the pins may be rectangular as shown in FIG. 16 or may have other configurations, so long as each frame is properly positioned in the x and y directions of film advance and a line perpendicular thereto, and the film is secured from rotating about any axis normal to the plane of the film.

It is to be understood that the embodiments described above are merely illustrative examples of the invention disclosed and claimed herein, and that a variety of other modifications and variations are possible within the spirit and scope of the claims of this invention.

In particular the invention features disclosed above are not restricted to SLR 35mm cameras, but can be applied to most other cameras using films of all sizes. Also the end-of-film or lack-of-film indication means may take many other forms which comprise means for sensing the absence of film condition and means for signalling this information to an operator. Neither the end-of-film indication means nor the pin registration means must necessarily be carried by the rear cover of the camera or assembly attached thereto; the embodiments disclosed herein so mounted on the rear cover merely illustrate a very practical manner of practicing this invention. Also in the pin registration technique a variety of different combinations of film sprocket holes may be selected for registration with the pins, and as discussed earlier, the pins may have a variety of shapes.

We claim:

1. In a camera operable with a strip of film having top and bottom edges extending in the direction of film advance, the camera including a film aperture having a length dimension along the top and bottom edges thereof in the direction of film advance and a height dimension in a transverse direction normal to said length, top and bottom film guides and lands along said top and bottom edges respectively of said aperture, and a rear cover which when closed has a first part generally adjacent said film aperture and film guides and lands, the improvement in combination therewith of an end-of-film indication means comprising an electrical ground contact located at a predetermined point in the film advance direction along said top edge of said aperture in the vicinity of said top film guide and land, this contact being covered by the top edge of any of said film in the camera having a top edge which is advanced to the same position as said predetermined point of said ground contact, an indicator pin carried by said rear cover, means for resiliantly urging said pin to move toward and touch said ground contact, circuit means including said ground contact, said indicator pin, and signal means, whereby said pin touches said contact and closes said circuit activating said signal means only when said film having a top edge is not present and covering said ground contact.

2. A camera according to claim 1 and operable with film having a leader part at the lead end comprising at least the bottom edge of the strip with the top edge removed.

3. A camera according to claim 1 wherein said signal means comprises a light source.

4. In a 35mm camera operable with a strip of standard 35mm film having standard aligned pairs of sprocket holes along the top and bottom edges thereof, the camera including an aperture having length in the direction of film advance and height in a transverse direction normal to said length, film guides extending along the top and bottom edges of said aperture in the length direction, a drive sprocket adjacent the lead ends of said film guides with clearance spaces defined between the upper and lower teeth of said drive sprocket and said lead ends of the film guides, and a rear cover which when closed has a first part adjacent said clearance spaces, the improvement in combination therewith of a pin registration system comprising a pair of first and second movable registration pins carried by said first part of the rear cover, each pin having a tip part smaller than said film sprocket hole for entering a sprocket hole and a base part of greater dimension than said tip for engaging edges of the hole when the pin is fully seated therein, means for moving said pins so that their ends approach the film, enter a pair of upper and lower sprocket holes, penetrate said holes until the base parts of the pins seat fully in said holes, and the pin ends extend into said clearance spaces, wherein said first pin has a base part of cross-sectional configuration and dimensions substantially the same as that of the film sprocket holes, said second pin has a base part which in section has a length dimension in the direction of film advance substantially the same as that of a sprocket hole, and a width dimension less than that of said sprocket hole, thereby allowing a small amount of play between the pin and the hole in the width direction, whereby said film in the vicinity of said pins is automatically forced by the base parts of the pins to conform to the pin spacing and orientation, thereby forcing said film into alignment and registration with said pins, and means for retracting said pins out of said sprocket holes to allow the film to be advanced and rewound.

5. A camera according to claim 4 wherein said pin registration system further comprises a base plate mounted on the outside of said rear cover of the camera, said means for moving said pins into engagement with said film comprises a solenoid mounted on said base, and said means for retracting said pins comprises a spring mounted on said base and biasing said pins into a retracted position.

6. A camera according to claim 4 wherein said pins are secured to said spring and said solenoid has an armature which, when energized, drives said spring toward said film, thereby carrying the pins into engagement with the film, said armature when de-energized being driven with said pins to said retracted position by said spring.

7. A camera according to claim 4 wherein said camera is a single lens reflex type of camera.

8. A camera according to claim 4 wherein said rear cover has first and second ends, hinge means connecting the first end to the camera, and means for aligning and releasably coupling said second end to the camera.

9. In a 35mm camera operable with a strip of standard 35mm film having standard aligned pairs of sprocket holes along the top and bottom edges thereof, the camera including an aperture having length in the direction of film advance and height in a transverse direction normal to said length, top and bottom film guides and lands extending along the top and bottom edges respectively of said aperture in the length direction, a drive sprocket adjacent the lead ends of said film guides with clearance spaces defined between the upper and lower teeth of said drive sprocket and said lead ends of the film guides, and a rear cover which when closed has a first part generally adjacent said clearance spaces and aperture and film guides and lands, the improvement in combination therewith of a pin registration system comprising a pair of first and second movable registration pins carried by said first part of the rear cover, each pin having a tip part smaller than said film sprocket hole for entering a sprocket hole and a base part of greater dimension than said tip for engaging edges of the hole when the pin is fully seated therein, means for moving said pins so that their ends approach the film, enter a pair of upper and lower sprocket holes, penetrate said holes until the base parts of the pins seat fully in said holes, and the pin ends extend into said clearance spaces, whereby said film in the vicinity of said pins is automatically forced by the base parts of the pins to conform to the pin spacing and orientation, thereby forcing said film into alignment and registration with said pins, and means for retracting said pins out of said sprocket holes to allow the film to be advanced and rewound, said camera including the further improvement in combination therewith of an end-of-film indication means comprising an electrical ground contact located at a predetermined point in the film advance direction along said top edge of said aperture in the vicinity of said top film guide and land, this contact being covered by the top edge of any of said film in the camera having a top edge which is advanced to the same position as said predetermined point of said ground contact, an indicator pin carried by said rear cover, means for resiliently urging said pin to move toward and touch said ground contact, circuit means including said ground contact, said indicator pin, and signal means, whereby said pin touches said contact and closes said circuit activating said signal means only when said film having a top edge is not present and covering said ground contact.

10. In a 35mm camera operable with a strip of standard 35mm film having aligned pairs of generally rectangular sprocket holes along opposite edges of the film, each sprocket hole having length in the film advance direction and width normal to said length, the camera including a film aperture having a pair of edges extending in the film advance direction, film guides extending along said edges of said film aperture and having opposite ends, a drive sprocket for engaging said film sprocket holes and advancing the film, and a rear cover, the improvement in combination therewith of a pin registration system comprising (a) a pair of first and second movable registration pins carried by said cover, each pin having a tip end for entering a film sprocket hole and a base part for engaging edges of the film sprocket hole when the pin is extended therein and the base part is at the film plane, the tip end having tip cross-sectional dimensions of length and width less than length and width of a typical film sprocket hole, and a base part also having cross-sectional dimensions in said length and width directions, (b) means for moving said pins generally axially so that their tip ends approach and enter two of said film sprocket holes, and said pins extend into said holes until the base parts thereof reach the film plane, the base part of said first pin having maximum cross-sectional dimensions in the length and width directions substantially the same as those of the film sprocket holes, and the base part of said second pin having (i) only a first of said length and width dimensions substantially the same as those of a typical film sprocket hole, and (ii) the second of said length and width dimensions less than those of a typical film sprocket hole, thereby allowing a small amount of play between the base of the second pin and the associated film sprocket hole in the direction of said second dimension, whereby said film in the vicinity of said pins is automatically forced by the base parts of the pins to conform to the pin spacing and orientation, and (c) means for retracting said pins out of said film sprocket holes to allow the film to be advanced or rewound.

* * * * *